United States Patent [19]

Glennon et al.

[11] Patent Number: 4,974,664

[45] Date of Patent: Dec. 4, 1990

[54] COMPENSATING FOR WATER PUMP SPEED VARIATIONS IN A TEMPERED AIR SYSTEM FOR VEHICLE PASSENGER COMPARTMENTS

[75] Inventors: Thomas F. Glennon, Darien; Dennis DeVera, Carol Stream, both of Ill.

[73] Assignee: Eaton Corporation, Cleveland, Ohio

[21] Appl. No.: 497,873

[22] Filed: Feb. 14, 1990

[51] Int. Cl.$^5$ .................. F25B 29/00; G05D 23/00
[52] U.S. Cl. ................................ 165/2; 165/39; 165/40; 165/42; 165/43; 237/2 A; 237/12.3 B; 417/293
[58] Field of Search ............. 237/2 A, 12.3 A, 12.3 B; 165/39, 40, 42, 43, 2; 417/293, 294

[56] References Cited

U.S. PATENT DOCUMENTS

| | | | |
|---|---|---|---|
| 2,277,598 | 3/1942 | McCollum | 237/2 A |
| 3,032,324 | 5/1962 | Fiala | 237/2 A |
| 3,122,199 | 2/1964 | Byloff | 165/40 |
| 3,183,962 | 5/1965 | Steinhagen et al. | 165/42 |
| 3,658,244 | 4/1972 | Caldwell | 237/2 A |
| 4,058,255 | 11/1977 | Linda et al. | 237/12.3 B |
| 4,189,093 | 2/1980 | Schnaibel et al. | 165/40 |
| 4,373,666 | 2/1983 | Williams | 237/12.3 B |
| 4,417,688 | 11/1983 | Schnaibel et al. | 237/2 A |
| 4,462,541 | 7/1984 | Hansen | 237/2 A |
| 4,482,092 | 11/1984 | Biber et al. | 165/43 |

FOREIGN PATENT DOCUMENTS

| | | | |
|---|---|---|---|
| 0065802 | 5/1979 | Japan | 417/293 |
| 0197709 | 2/1977 | U.S.S.R. | 165/40 |

Primary Examiner—John Ford
Attorney, Agent, or Firm—R. A. Johnston

[57] ABSTRACT

An automatic control system for regulating the temperature of blower air discharged over a heater core to a vehicle passenger compartment. A thermistor is disposed to sense discharge air adjacent the heater core and provide a temperature signal. An electrical indication is provided of the condition of a servomotor driven valve controlling water flow to the heater core. An electrical reference signal is provided indicative of a user selected relative change of flow discharge air temperature. A signal is provided indicating the speed of the water pump circulating liquid to the heater core. The signals are summed and the valve sums driven until the sum is zero and the valve modulated to maintain the sum at zero for regulating blower air discharge temperature constant.

4 Claims, 2 Drawing Sheets

COMPENSATING FOR WATER PUMP SPEED VARIATIONS IN A TEMPERED AIR SYSTEM FOR VEHICLE PASSENGER COMPARTMENTS

BACKGROUND OF THE INVENTION

The present invention relates to passenger comfort or climate control systems employed in the passenger compartment of automotive vehicles. Heretofore, where it has been desired to provide a way or means of controlling the discharge air temperature of an automotive heating and air conditioning system, temperature control has been accomplished by varying the opening of the water valve and controlling flow through the heater core or cabin heat exchanger to provide the desired temperature. It has been proposed in co-pending application Ser. No. 248,864 filed Sep. 23, 1988 entitled "Regulating Heater Discharge Air Temperature for Front and Rear Passengers in a Vehicle", commonly owned with the present application to provide automatic control of the heater core water valve by sensing the temperature of the discharge air over the cabin heat exchanger and the position of the valve and comparing with respect to a reference temperature level for generating a control signal to modulate the water valve. This latter type of system functions to regulate the heat exchanger discharge air temperature about a relatively selected level.

However, problems have been experienced in employing the aforesaid automatic discharge air temperature regulation system when the water pump is driven at engine idle speed, because at idle speed there is insufficient flow of heated liquid through the heat exchanger to enable the heat exchanger to provide adequate heat to the discharge air stream as may be needed for the desired regulation. Furthermore, if adequate flow of a liquid is provided at engine idle speed, then at higher engine RPM's encountered at road speeds the water valve is operated in the nearly closed position by the system in order to maintain proper regulation; consequently, it has been necessary for the sensitivity of the system, or resolution of the movement of the water valve to be prohibitively high in order to prevent over controlling or "hunting".

Accordingly, it has been desired to provide a way or means of compensating for variations in speed of an engine driven water pump for controlling liquid flow to a heat exchanger employed in a vehicle passenger compartment.

SUMMARY OF THE INVENTION

The present invention provides a control system for regulating the temperature of forced air discharged from a heat exchanger employed in a vehicle passenger compartment. A butterfly-type water valve is provided at the inlet of the exothermic heat exchanger or heater core; and, the position of the valve is modulated in response to a control signal for controlling flow of the engine coolant or heating fluid to the exothermic heat exchanger.

A thermistor is disposed adjacent the heat exchanger to sense the temperature of the forced air discharged thereover and into the passenger compartment. A temperature selection control is provided for selection of the relative temperature level desired by the passengers. An electric controller employing a microprocessor receives an electric reference signal representing the relative temperature selected, an electrical signal indicative of the temperature sensed by the thermistor, an electrical indication of the valve position and an electrical signal indicative of the engine speed. The controller generates an control signal proportional to the sum of these signals; and, a motorized valve servo actuator is responsive to the control signal to move the valve until the sum is zeroed. The resultant control of the flow of coolant to the heat exchanger provides regulation of the discharge air temperature to the passenger compartment about the selected relative level.

In the simplest form of the invention, only a heating mode or exothermic heat exchanger is employed. In the preferred practice of the invention however, a refrigerant evaporator or endothermic heat exchanger is disposed in the forced air stream upstream of the heater core or exothermic heat exchanger, or between the heater core and the blower.

In this preferred arrangement, a module is provided with the evaporator and heater core in tandem in the forced air stream in the plenum housing; and, the sensed temperature is the result of the combined effects of cooling and heating of the forced air. The present invention thus provides an automatic control system for regulating the blower air discharge temperature about relatively desired temperature level for maintaining passenger comfort.

The control system of the present invention provides a novel technique for passenger compartment blower air temperature regulation and functions to automatically modulate the position of a valve controlling flow of heated engine coolant to a heater core disposed in the passenger compartment for regulating discharge air temperature about a user selected relative level. The automatic regulation accommodates changes in speed of the engine driven water pump or changes in the passenger selected blower speed.

DETAILED DESCRIPTION

Figure 1:
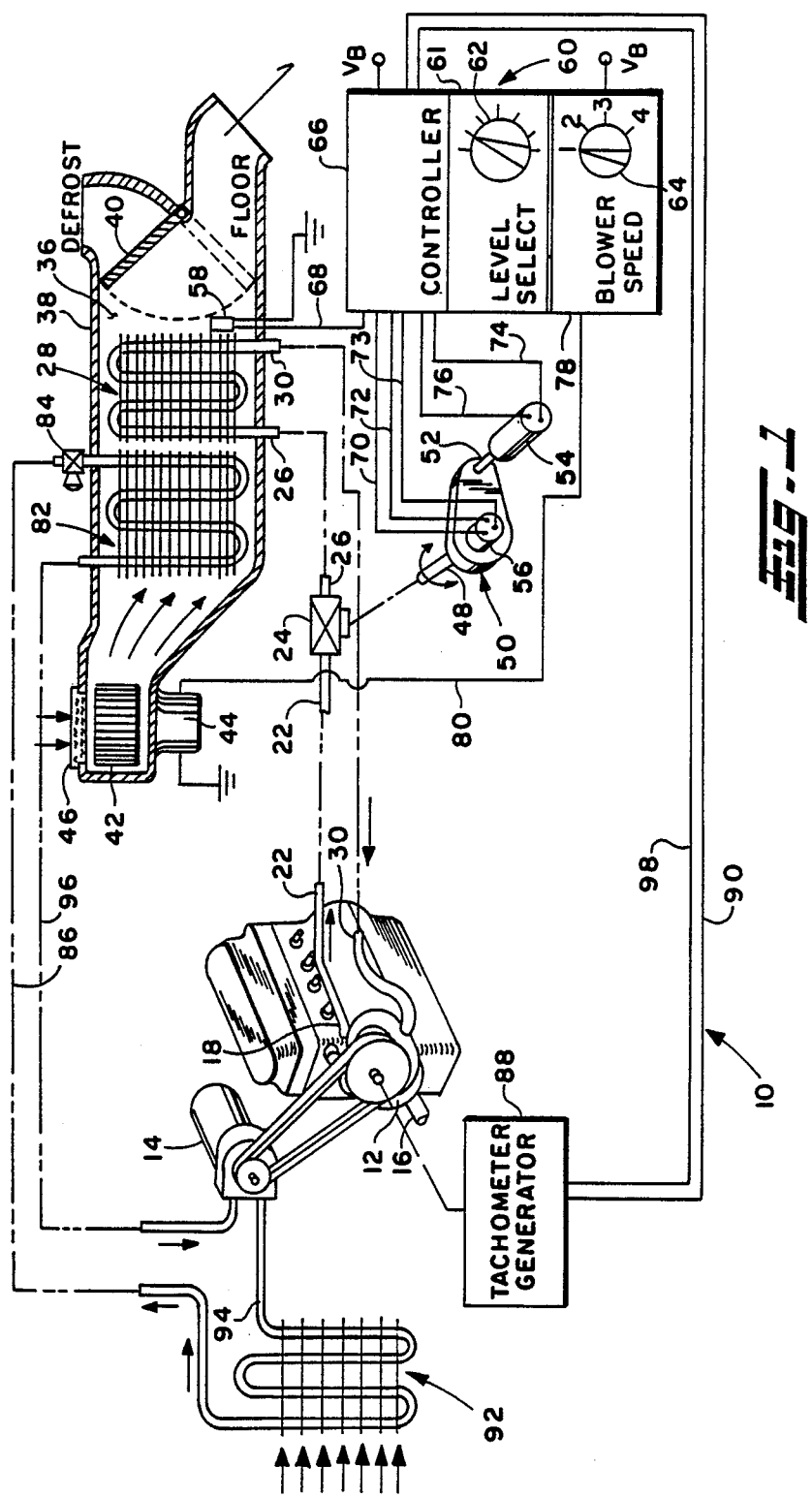
FIG. 1 is a pictorial, somewhat schematic representation of the control system showing the arrangement of the heat exchangers, controllers and valve actuators; and, FIG. 2 is an electrical schematic of the circuitry employed in the system of FIG. 1.

Referring to FIG. 1, the control system of the present invention is indicated generally by the reference numeral 10 and is shown as installed in a typical automotive passenger vehicle having an engine driven water pump 12 for circulating engine coolant and also an engine driven refrigerant compressor 14 for circulating refrigerant. The water pump 12 has a primary inlet 16 for receiving therein coolant from the engine cooling radiator (not shown); and, the pump has its primary outlet communicating with the internal passages for circulation of coolant through the engine and which passages are not shown in FIG. 1 for the sake of brevity. Water pump 12 has an auxiliary outlet 18 which is connected for providing a source of engine coolant through conduit 22 to the inlet of a control valve 24, preferably of the butterfly type. Valve 24 has its outlet connected through conduit 26 to the inlet of a heater core or heat exchanger indicated generally at 28. The heater core 28 circulates coolant through conduit 30 which is connected to an auxiliary return of the water pump 12. In the presently preferred practice, valve 24 is a by-pass type butterfly valve giving substantially full flow with 30° rotation of the butterfly from the closed position.

Heater core 28 is disposed in a plenum chamber 36 formed within a housing or duct 38 disposed in the vehicle passenger compartment. The housing 38 has an upper or "DEFROST" outlet and a lower or "FLOOR" outlet with a pivotally disposed vane or mode select door 40 which provides for selection of the outlet to be supplied. Vane 40 may be moved by an suitable type of actuator (not shown) either manually or automatically.

Housing 38 also has disposed therein a suitable blower 42 driven by motor 44 mounted externally to the housing and with the shaft thereof extending through the housing wall. Blower 42 is supplied with air through a suitable filtered inlet 46 which may be selectably connected (by means not shown) for either recirculation of passenger compartment air or for intake of ambient air from the vehicle exterior as is well known in the art. Upon energization of motor 44, blower 42 provides a flow of air over the heat exchanger 28 for discharge through either the FLOOR or DEFROST outlets as desired.

The butterfly control valve 24 is connected via shaft 48 to a rotary servo-actuator, indicated generally by numeral 50, which has a shaft 48 as its output, and an input shaft 52 thereof connected to a suitable reversible 12 volt DC motor 54. Actuator 50 has provided thereon a position sensor 56 for output shaft 48 in the form of potentiometer which is operative as will be hereinafter described, to provide an electrical signal indicative of the rotary position of shaft 48. Actuator 50 is operative upon the energization of motor 54 to rotate output shaft 48 in either a clockwise or counter clockwise sense for moving a butterfly vane member (not shown) within valve 24 for modulating coolant flow to the heat exchanger 28. In the presently preferred practice, servo-actuator 50 includes a speed reducer providing a reduced rate of rotation at output shaft 48. A ratio of 30:1 has been found satisfactory from input to output of the servo-actuator 50, but other ratios may be employed as desired to provide differing rates of response.

Although a D.C. motorized servo-actuator with a feedback potentiometer is disclosed, it will be understood the the potentiometer, can be eliminated if desired and other feedback techniques employed to indicate valve condition. Also, a stepper motor may be employed, in which case the speed reducer will not require the high ratio of input to output; and, if stepper motor torque is sufficient, speed reduction may not be require.

A discharge air temperature sensor in the form of thermistor 58 is disposed within the plenum 36 closely adjacent the downstream or discharge edge of the heater core 28 for sensing the temperature of the air in the plenum chamber.

A control module, indicated generally by reference numeral 60, is disposed in the vehicle passenger compartment in a suitable manner as to be readily accessible to the occupants, preferably the driver. The module 60 includes a temperature LEVEL SELECT control 61 having a rotatable knob 62, an electronic controller 66; and module 60 may include a blower speed control 78 having a selector knob 64.

The controller 66 receives power from the vehicle power supply $V_B$ and is connected to receive an input from thermistor 58 along lead 68 and is also connected to the receive an input from the feedback potentiometer 56 along leads 70, 72 with lead 73 being the neutral or ground lead. Drive motor 54 is connected to controller 66 via leads 74, 76. The blower motor 44 is connected on one side to blower speed control 78 by lead 80 with the opposite lead of the motor grounded to the common ground for the supply $V_B$.

If the vehicle is equipped with passenger compartment air conditioning, a second endothermic heat exchanger comprising a refrigerant evaporator, indicated generally by numeral 82, is disposed in the housing 38 upstream of the heater core 28 or between the heater core 28 and the blower 42. Evaporator 82 is supplied refrigerant through a thermal expansion valve 84 which has its inlet connected via conduit 86 to the outlet of refrigerant liquefication heat exchanger, or condenser, indicated generally by numeral 92. Condenser 92 is supplied via conduit 94 which is connected to the high pressure discharge outlet port of compressor 14.

In the system illustrated in FIG. 1, the flow of refrigerant to the evaporator 82 is controlled by the thermal expansion valve 84 in a manner well known in the art to maintain optimum vaporization of the liquid coolant such that a slight amount of super heat is provided at the outlet of the evaporator and such that no liquid is returned through conduit 96 to the low pressure suction port of compressor 14. With the evaporator 82 in place in the blower streams ahead of the heater core 28, the thermistor 58 is operative to sense the combined cooling and heating effects of the two heat exchangers.

The temperature of the forced air flow in plenum chamber 36 is controlled in this arrangement by modulating the position of water valve 24 and controlling the flow of coolant through the evaporator 28. Thus, it will be seen that the simplest form of the system, which employs only heater core 28, retains the ability to control and regulate the plenum discharge temperature upon the addition of air conditioning evaporator 82 into the system. Thus, the control system may be employed either with or without air conditioning in the vehicle.

A tachometer generator 88 is provided for providing an engine speed signal along lead 90 to the controller 66. Generator 88 is shown mechanically driven by the engine as illustrated by the dashed line in FIG. 1; however, alternatively, an ignition pulse signal may be used as an engine speed indicator, as is well known in the art.

Figure 2:
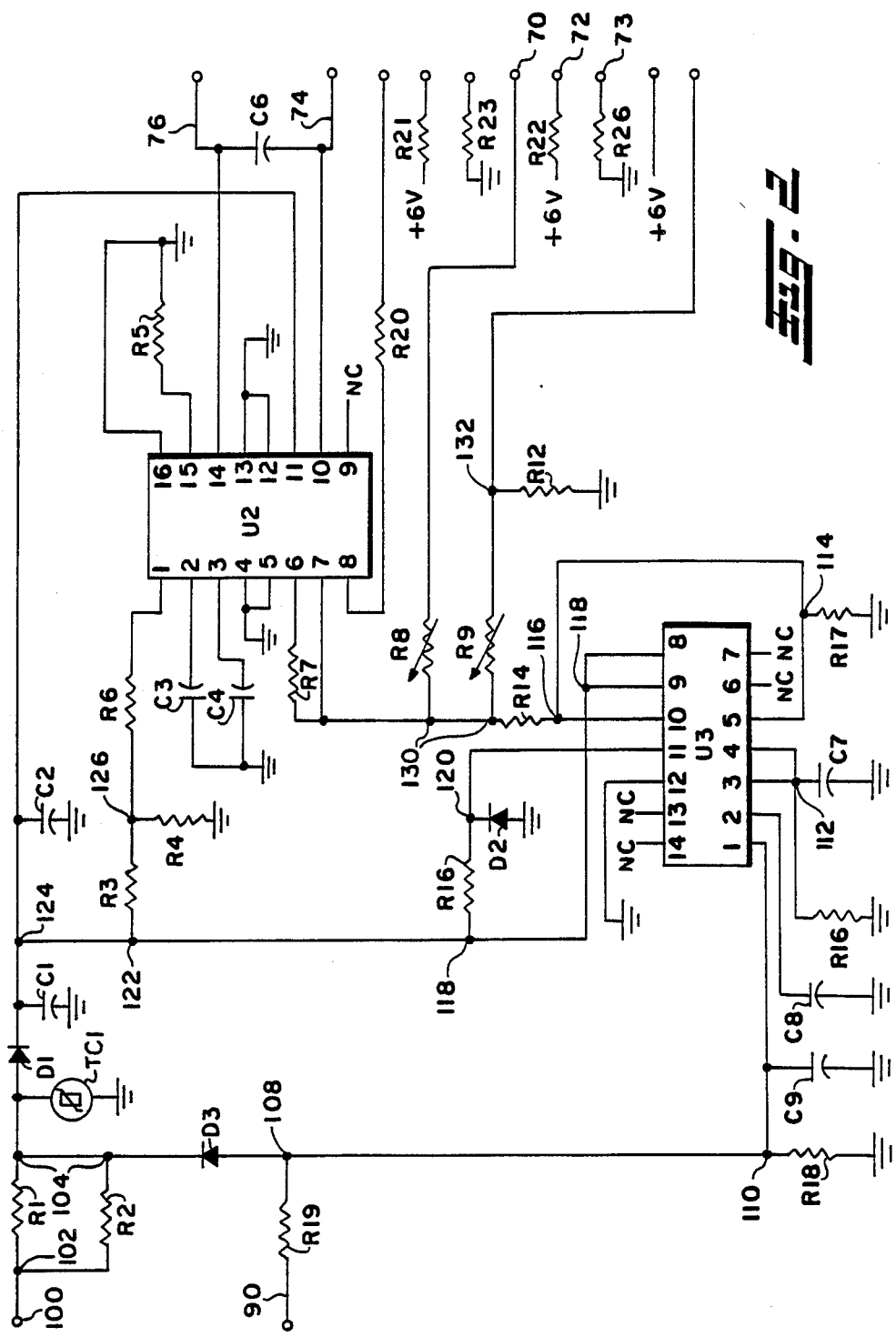

Referring to FIG. 2, the electrical circuitry for the invention is illustrated and includes a power supply for the control module 60, wherein the onboard vehicle power supply $V_B$ is connected through terminal 100 and through to junction 102. A pair of resistors R1 and R2 are connected in parallel to junction 102 and junction 104 which is grounded through Zener device TC1 which is a 22 volt metal oxide varistor functioning as a transient suppressor. Junction 104 is connected through a forward poled diode D1 to junction 106 which is grounded through capacitor C1 and which provides the power supply voltage Vcc.

The controller 66 comprises a microprocessor designated U2 in FIG. 2, and which, in the presently preferred practice of the invention, bears manufacturer's designation MC33030 and is available from Motorola Semiconductor Div. Schaumberg, Ill.

The signal from the tachometer generator 88 is received along lead 90 through R19 at junction 108 which is connected through forward diode D3 to junction 104. Junction 108 is also connected through junction 110 and through R18 to ground. J-unction 110 is also connected in parallel through capacitor C9 to ground.

Junction 110 is also connected to input pin 1 of a frequency to voltage converter U3, which, in the presently preferred practice is a device obtained from National Semiconductor Corporation and bears manufacturer's designation LM2707. U3 has pin 2 thereof grounded through C8 and pins 3 and 4 connected to junction 112 which is grounded through resistor R16 and capacitor C7.

Pin 5 of U3 is connected to junction 114 which is grounded through R17 and also connected to junction 116 and which provides an output voltage at engine idle of 0.7 volts and provides 20 milliamps at approximately 2.05 volts. Pins 8 and 9 of U3 are connected to junction 118. Pin 10 is also connected to junction 116. Pin 11 of U3 is connected to junction 120 which is connected to ground through reverse poled Zener diode D2 having a threshold voltage of 3.5 volts for transient suppression. Junction 118 is also connected to junction 122 and to power junction 124 which receives power from junction 106.

Junction 122 is connected through resistor R3 to junction 126 which is grounded through R4 and also connected through R6 to pin 1 of a microprocessor U2 which comprises a semiconductor device manufactured by Motorola Semiconduction Div. Schaumberg, Ill. bearing manufacturer's designation 33030. Pin 2 of U2 is grounded through C3; and, pin 3 is grounded through C4. Pins 4 and 5 are grounded directly and pin 6 receives an input through R7 from junction 128 which is also connected to pin 7. Junction 128 is also connected to junction 130 which receives a signal through R14 from junction 116. Junction 130 is connected through R9 through junction 132 which is grounded through R12 and also connected to signal line 68 of the thermistor 58.

Junction 130 is also connected through R8 to lead 70 of the feedback potentiometer 50 with lead 73 grounded and lead 72 receiving a low bias voltage through R26.

U3 has pin 16 thereof connected through C8 to ground and pin 15 thereof connected through R6 to ground. Pins 14 and 10 of U2 are connected respectively to motor output leads 76, 74 for the servo motor; and, capacitor C6 is connected therebetween. Pin 8 is connected through R20 to the level select control 62 which comprises a potentiometer receiving power through R21 with the center tap thereof grounded through R23.

Pin 9 of U2 is unused. Junction 124 is also grounded through transient suppression capacitor C2.

In operation, the microprocessor U2 performs the summation according to the expression $$K_1 V_{ch} - K_2 V_{fb} - K_3 V_{ts} - K_4 V_{rpm} = 0,$$

where $$A_1 = 1, K_2 = R7/R8, K_3 = R7/R9,$$

and $$K_4 = R7/R14.$$

$V_{ch}$ is the voltage from the level selector 62, $V_{fb}$ is the voltage from the feedback potentiometer 65 $V_{ts}$ is the voltage from the thermistor 58 and $V_{rpm}$ is the voltage received from junction 116 from output pin 5 of the frequency to voltage converter U3.

Microprocessor U2 is operative to provide forward and reverse motor control signals along lines 74, 76 to modulate the position of the valve 24 to continuously satisfy the summation, thereby maintaining the discharge temperature of the air in duct 36 at a constant temperature.

Values of the resistances, capacitances and designations of the solid state components are given in table I.

| Destination R | Ohms | C | Microfarads | Device | |
|---|---|---|---|---|---|
| 1,2 | 43,½W | 1 | 10 | D1 | 1N4002 |
| 3,4,6 | 10K | 2 | 400 | D2 | 3.5V;Z |
| 5 | 68K | | | | |
| 7 | 110K | 3,4,6 | 0.1 | D3 | 1N4148 |
| 8 | 50K | 5,7 | 1 | V2 | MC33030 |
| 9 | 6.2K | 8,9 | 1 | U3 | LM2907 |
| 12,16 | 10K | | | | |
| 14 | 130K | | | | |
| 16 | 100K | | | | |
| 17 | 10K | | | | |
| 18 | 20K | | | | |
| 19 | 82K | | | | |
| 20 | 20K | | | | |
| 21 | | | | | |
| 22 | | | | | |
| 23 | | | | | |
| 26 | | | | | |

The present invention thus provides an automatic system for regulating the temperature of tempered air discharging from the vehicle heating and airconditioning system at a constant level by modulating the position of the water valve supplying heated engine coolant to the heater core. The system of the present invention provides an engine speed input to the controller which sums the engine speed signal, an electrical indication of a water valve position, a desired reference level signal and a temperature signal from a thermistor located at the temperature discharge side of the heater core.

The system operates to maintain the summation at zero by modulating the position of the water valve.

Although the invention has herein above described with respect to illustrated embodiment, it would be understood that the modifications and variations of the invention may be made by those of ordinary skill in the art; and, the invention is limited only by the following claims:

We claim:

1. A system for controlling blower air discharge temperature for heating and cooling a passenger compartment of a motorized vehicle comprising;
    (a) a source of heated fluid circulated by pump means driven from the vehicle motor;
    (b) blower means, including duct means, operative upon energization to direct a flow of air to the vehicle compartment;
    (c) exothermic heat exchanger means disposed in said duct means and connected for circulation of said heated fluid therethrough and operative to heat said flow of air thereupon;
    (d) electrically operated valve means disposed in said conduit means and operative to control flow of said fluid through said heat exchanger means;
    (e) temperature sensing means disposed proximate said heat exchanger means and operative to sense the temperature of said air flow directed to said passenger compartment, said sensor means operative to provide an electrical temperature signal indicative of changes in said sensed directed air temperature;

(f) speed sensing means disposed to sense the speed of said pump means and operative to provide an electrical flow rate signal indicative of the discharge rate of said pump means;

(g) level control means operative upon user input to provide an electrical relative temperature desired signal;

(h) circuit means including microcomputer means receiving said flow rate signal, said directed air temperature signal and said relative temperature desired signal at the inputs thereof; for said valve means in accordance with a predetermined algorithm such that said valve varies flow of said heated fluid to regulate changes in temperature of said directed air about a reference level irrespective of changes in the speed of said pump means.

2. The system defined in claim 1, wherein said microcomputer means is operable in response to a user input from said level control means to change said directed air temperature.

3. A method of regulating the temperature of blower discharge air in a vehicle passenger compartment heating system;

(a) providing an exothermic heat exchanger and flowing heated liquid therethrough from an engine driven pump;

(b) forcing a flow of air over the heat exchanger and directing the flow into the vehicle passenger compartment;

(c) providing a motor driven valve for controlling liquid flow to the heat exchanger and providing an electrical indication of the condition of said valve;

(d) sensing the temperature of the air flow over said heat exchanger and providing an electrical temperature signal;

(e) sensing the speed of the pump and generating an electrical pump speed signal;

(f) generating an electrical reference signal indicative of a user selected relative temperature signal;

(g) summing said indication of valve condition, said temperature signal, said pump speed signal and said reference signal;

(h) driving said valve motor until said sum is zero and modulating said valve condition for maintaining said sum at zero.

4. The method defined in claim 3 further comprising the (a) disposing a refrigerant evaporator in said forced air flow upstream of said heat exchanger, and, (b) flowing refrigerant through said evaporator.

* * * * *